United States Patent Office 2,815,347
Patented Dec. 3, 1957

2,815,347

VAT DYESTUFFS OF THE ANTHRAQUINONE SERIES AND PROCESS FOR THEIR MANUFACTURE

Maurice Grelat and Walter Jenny, Basel, Switzerland, assignors to Ciba Limited, Basel, Switzerland, a Swiss firm No Drawing. Application March 2, 1956,
Serial No. 568,989

Claims priority, application Switzerland April 25, 1955

8 Claims. (Cl. 260—272)

This invention provides valuable new vat dyestuffs which contain the grouping of the formula (1) 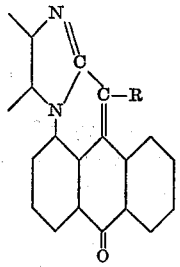

in which R represents a substituent and the anthra-pyridine nucleus may contain further substituents.

The invention also provides a process for the manufacture of the dyestuffs of the above Formula 1, wherein a compound containing the grouping (2) 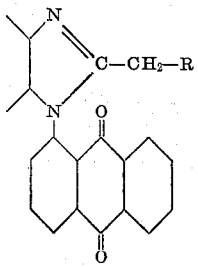

in which R represents a substituent and the anthraquinone ring may contain further substituents, is treated with an alkaline agent capable of bringing about ring closure. The compounds used as starting materials, which contain the grouping of the Formula 2, can be prepared by condensing a 1-(ortho-aminoarylamino)-anthraquinone with a reactive functional derivative of a carboxylic acid of the formula R—CH$_2$—COOH, advantageously with a halide or anhydride of a lower fatty acid which may be substituted, for example, acetic anhydride, propionyl chloride, butyryl chloride, chloracetyl chloride or phenylacetyl chloride, and subsequently bringing about ring closure to form the imidazole by the action of an agent capable of eliminating water, for example, concentrated sulfuric acid.

By suitably choosing the conditions, for example, by heating the 1 - (ortho - aminoarylamino)-anthraquinone with a large excess of the acylating agent in the presence of concentrated sulfuric acid, it is possible to bring about the acylation and ring closure to the imidazole in one operation.

Especially suitable starting materials are compounds containing the grouping of the Formula 2, in which the two nitrogen atoms of the imidazole ring are bound to a ring system consisting of a plurality of condensed benzene nuclei, and especially to an anthraquinone nucleus, that is to say, compounds of the formulae (3) 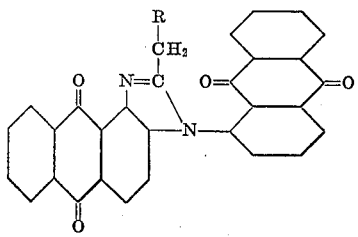

and (4) 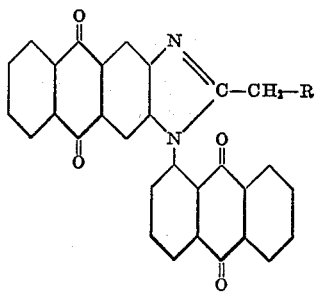

in which the two anthraquinone nuclei may contain further substituents. These compounds are obtained by subjecting ortho-amino-2:1'-dianthrimides to acylation and imidazole ring closure. The latter dianthrimides can be obtained by the condensation of ortho-phthalimido-halogen-anthraquinones with α-aminoanthraquinones followed by splitting of the phthaloyl radical, advantageously with the aid of hydrazine hydrate. In this manner 1-amino-2:1'-dianthrimides and 3-amino-2:1'-dianthrimides are obtained in good yield.

Ring closure to form the compounds of the Formula 1 is carried out, as is usual for such reactions, with an alkaline agent, advantageously with an alcoholic solution of an alkali metal hydroxide.

The new compounds contain the grouping of the Formula 1, in which R represents a substituent, for example, a hydrogen atom, an alkyl group of low molecular weight, a phenyl radical, a halogen atom or a substituted amino group, and in which the anthra-pyridine nucleus may contain further substituents. Of special interest are those compounds containing the grouping of the Formula 1, in which the two nitrogen atoms of the imidazole ring are bound to a ring system consisting of a plurality of condensed benzene nuclei, and especially an anthraquinone radical. These compounds are valuable dyestuffs, especially vat dystuffs, which can be used in the ordinary way, for example, also as pigments, and which dye a very wide variety of fibers, but especially cotton, linen, and artificial silk of regenerated cellulose from a vat in pure strong yellow tints. The dyestuffs are distinguished in that they dye equally well according to all the dyeing processes customary in vat dyeing. They are also excellently suited for printing and can also be used in the form of their leuco-ester salts obtained in the usual manner, for example, the sulfuric acid ester salts.

The following examples illustrate the invention, the parts and percentages being by weight.

Example 1

7 parts of 2-amino-3:1'-dianthrimide and 60 parts of acetic anhydride are heated to 100° C. In the course of 5–10 minutes there are added, while stirring, 10 parts of concentrated sulfuric acid. The reaction mixture is further stirred for 5 minutes at 105–110° C. until dissolution is complete. The hot solution is then introduced into 300 parts of warm water. The suspension so obtained is rendered weakly alkaline with ammonia solution of 25 percent strength, the reaction product is filtered off with suction, washed with water and dried. There is obtained a grey powder which crystallizes from ortho-dichlorobenzene in the presence of active carbon in the form of pale yellow crystals. It is 5:6-phthaloyl-2-methyl-3-(1')-anthraquinonyl-benzimidazole of the constitution

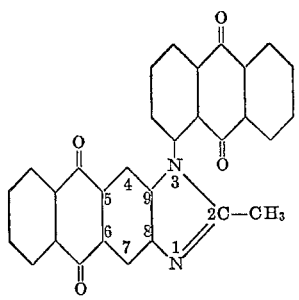

Analysis:

|   | Found | Theory |
|---|---|---|
| C | 76.91 | 76.89 |
| H | 3.48 | 3.45 |
| N | 5.95 | 5.98 |

5 parts of the latter compound are stirred in 150 parts of ethyl alcohol and 3 parts of sodium hydroxide solution of 35 percent strength for one hour at the boil. The pale yellow product initially formed changes rapidly into a strongly yellow colored substance, which is filtered off with suction, washed with alcohol and dried. The product so obtained has the constitution

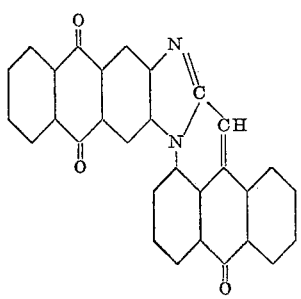

and dyes cotton from an orange-brown vat strong yellow tints having very good properties of fastness.

By using, instead of 5:6-phthaloyl-2-methyl-3-(1')-anthraquinonyl-benzimidazole, 5:6-phthaloyl-2-methyl-3-[1':4'- or 5'-methoxyanthraquinonyl]-benzimidazole as starting material there are obtained dyestuffs which dye cotton orange to red tints.

By using, instead of 5:6-phthaloyl-2-methyl-3-(1')-anthraquinonyl-benzimidazole, 5:6-phthaloyl-2-methyl-3-[1':4'- or 5'-benzoylaminoanthraquinonyl]-benzimidazole there are obtained dyestuffs which dye cotton orange to red-brown tints.

The same dyestuffs can be obtained by carrying out the ring closure with 5:6-phthaloyl-2-methyl-3-[1':4'- or 5'-nitroanthraquinonyl]-benzimidazoles and then reducing the nitro groups to amino groups and benzoylating.

*Example 2*

7 parts of 2-amino-3:1'-dianthrimide are reacted with 60 parts of propionic anhydride by the method described in Example 1. 5 parts of the resulting 5:6-phthaloyl-2-ethyl-3-(1')-anthraquinonyl-benzimidazole are stirred with 150 parts of ethyl alcohol and 3 parts of sodium hydroxide solution of 35 percent strength for one hour at the boil. The intensely yellow colored compound is filtered off with suction, washed with alcohol and dried. There is obtained a yellow powder, which crystallizes from α-chloronaphthalene in small yellow needles, and dyes cotton from an orange-brown vat strong greenish yellow tints having very good properties of fastness. The dyestuff has the constitution

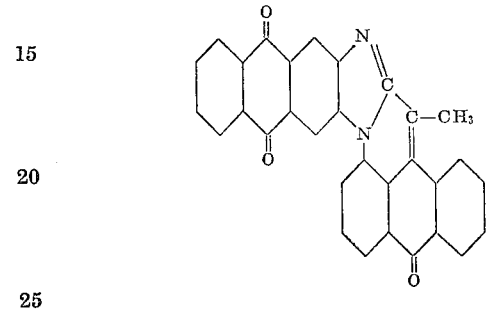

*Example 3*

15 parts of 2-amino-3:1'-dianthrimide, 170 parts of dry nitrobenzene and 7.7 parts of phenyl-acetic acid chloride are stirred for 4 hours at 140–150° C. After cooling the mixture, the reaction product is filtered off with suction, washed first with nitrobenzene and then with ether and dried. There are obtained 12 parts of 3-phenyl-acetyl-amino-2:1'-dianthrimide, and this compound is stirred in 120 parts of sulfuric acid of 90 percent strength for 1½ hours at 70° C. At the end of this period the imidazole ring closure is complete. The reaction mixture is poured on to 200 parts of ice, and the resulting suspension is rendered weakly alkaline with ammonia solution of 25 percent strength. The reaction product is filtered off with suction, washed with water and dried. The crude 5:6-phthaloyl-2-benzyl-3-(1')-anthraquinonyl-benzimidazole is purified by crystallization from a mixture of chloroform and ethyl alcohol.

5 parts of the resulting 5:6-phthaloyl-2-benzyl-3-(α)-anthraquinonyl-benzimidazole, 150 parts of ethyl alcohol and 3 parts of sodium hydroxide solution of 35 percent strength are stirred for one hour at the boil. The reaction product is filtered off with suction, washed with alcohol and dried. The dyestuff so obtained is a yellow powder and crystallizes from α-chloronaphthalene in yellow needles. It has the constitution

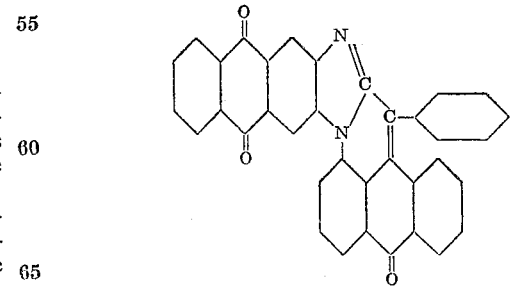

and dyes cotton from an orange-brown vat strong greenish yellow tints of good fastness.

*Example 4*

10 parts of 1-amino-2:1'-dianthrimide and 50 parts of acetic anhydride are heated to 100° C. In the course of 10 minutes 10 parts of concentrated sulfuric acid are introduced dropwise while stirring. The mixture is then stirred for a further 10 minutes at 100–110° C. The reaction mixture is cautiously poured into 300 parts of warm water. After the addition of 100 parts of glacial acetic acid, some resin is filtered off at 70° C., 200 parts of ammonia solution of 25 percent strength are added, and the precipitated imidazole is filtered off with suction, washed with water and dried. The crude product may be crystallized from a mixture of chloroform and alcohol.

5 parts of the product obtained as described in the preceding paragraph, 150 parts of ethyl alcohol and 3 parts of sodium hydroxide solution of 35 percent strength are stirred for one hour at the boil. The orange reaction product is filtered off with suction, washed with alcohol and dried. It can be crystallized from a large quantity of α-chloronaphthalene, and it dyes cotton from an orange-brown vat strong fast orange tints. The dyestuff has the constitution

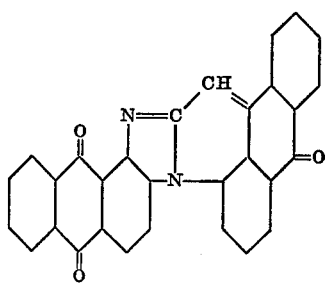

*Example 5*

1 part of the dyestuff obtained as described in the second paragraph of Example 1 is vatted in 100 parts of water with the addition of 4 parts by volume of sodium hydroxide solution of 30 percent strength and 2 parts of sodium hydrosulfite at 45° C. The stock vat so obtained is added to a solution of 4 parts by volume of sodium hydroxide solution of 30 percent strength and 2 parts of sodium hydrosulfite in 2000 parts of water. 100 parts of cotton are dyed in the resulting dyebath for one hour at 40–50° C. with the addition of 10 parts of sodium chloride. The cotton is then squeezed, oxidized in the air, rinsed, acidified, again rinsed and soaped at the boil. It is dyed a strong yellow tint and the dyeing possesses very good properties of fastness.

What is claimed is:

1. An anthraquinone vat dyestuff which corresponds to the formula

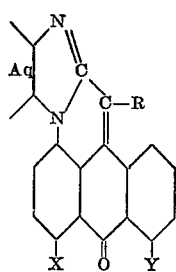

in which Aq is the anthraquinonyl radical, R is a member selected from the group consisting of hydrogen, alkyl having at most 3 carbon atoms and phenyl, X and Y are members selected from the group consisting of hydrogen, methoxy and benzoylamino.

2. An anthraquinone vat dyestuff which corresponds to the formula

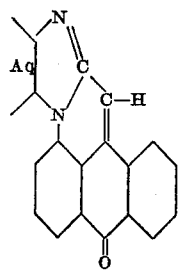

in which Aq is the anthraquinonyl radical.

3. The anthraquinone vat dyestuff of the formula

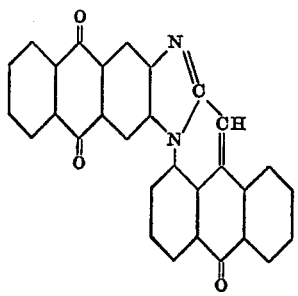

4. The anthraquinone vat dyestuff of the formula

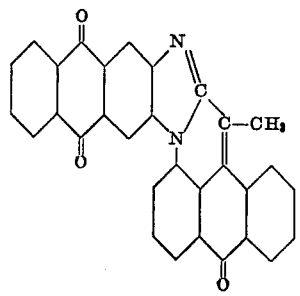

5. The anthraquinone vat dyestuff of the formula

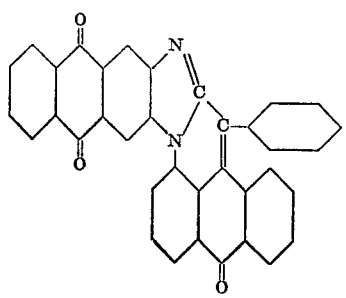

6. The anthraquinone vat dyestuff of the formula

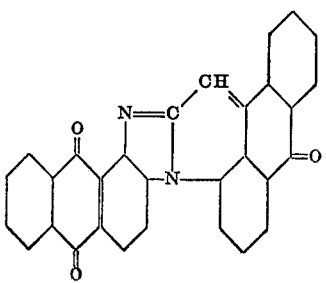

7. A process for the manufacture of vat dyestuffs which comprises heating a compound of the formula

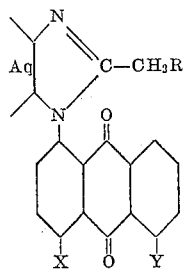

in which Aq is the anthraquinonyl radical, R is a member selected from the group consisting of hydrogen, alkyl having at most 3 carbon atoms and phenyl, X and Y are members selected from the group consisting of hydrogen, methoxy and benzoylamino with an alcoholic solution of an alkali metal hydroxide.

8. A process for the manufacture of vat dyestuffs which comprises heating a compound of the formula

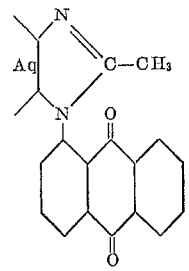

in which Aq is the anthraquinone radical with an alcoholic solution of an alkali metal hydroxide.

No references cited.